(12) United States Patent
Kawarada

(10) Patent No.: US 9,964,153 B2
(45) Date of Patent: May 8, 2018

(54) SUPPORT DEVICE FOR BEARING

(71) Applicant: TOYOTA JIDOSHA KABUSHIKI KAISHA, Toyota-shi, Aichi-ken (JP)

(72) Inventor: Kohki Kawarada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/382,078

(22) Filed: Dec. 16, 2016

(65) Prior Publication Data

US 2017/0184154 A1 Jun. 29, 2017

(30) Foreign Application Priority Data

Dec. 25, 2015 (JP) ................. 2015-254427

(51) Int. Cl.
*A47B 96/06* (2006.01)
*F16C 35/077* (2006.01)
*F16C 23/06* (2006.01)

(52) U.S. Cl.
CPC ............ *F16C 35/077* (2013.01); *F16C 23/06* (2013.01); *F16C 2226/60* (2013.01); *F16C 2326/06* (2013.01)

(58) Field of Classification Search
CPC .... F16C 35/077; F16C 23/06; F16C 2326/06; F16C 2226/60; F16C 35/042
See application file for complete search history.

(56) References Cited

FOREIGN PATENT DOCUMENTS

| JP | 2008-064287 A | 3/2008 |
| JP | 2008-082486 A | 4/2008 |
| JP | 2012-026495 A | 2/2012 |

*Primary Examiner* — Amy J. Sterling
(74) *Attorney, Agent, or Firm* — Oliff PLC

(57) ABSTRACT

A support device for a bearing that rotatably supports a shaft extending in a first direction includes a case that houses the bearing, and a bracket to which the case is fixed. When the case is fixed to the bracket, a first abutting portion of a case main body is in a state abutting against a first bracket abutting portion of a bracket main body in the first direction, and a second case abutting portion of the case main body is in a state abutting against a second bracket abutting portion of the bracket main body in a second direction that forms a right angle with the first direction. There is a region where the case and the bracket are separated between the abutting locations of these abutting portions.

8 Claims, 15 Drawing Sheets

SUPPORT DEVICE FOR BEARING

INCORPORATION BY REFERENCE

The disclosure of Japanese Patent Application No. 2015-254427 filed on Dec. 25, 2015 including the specification, drawings and abstract is incorporated herein by reference in its entirety.

BACKGROUND

1. Technical Field

The disclosure relates to a support device for a bearing that rotatably supports a shaft.

2. Description of Related Art

A bearing for supporting a driveshaft of a vehicle is fixed to a bracket provided on the vehicle side. Japanese Patent Application Publication No. 2012-26495 (JP 2012-26495 A) describes supporting a bearing for supporting a driveshaft by sandwiching the bearing between a bearing cap and a bracket on the vehicle side. With the device described in JP 2012-26495 A, approximately one-half of the bearing is supported by being fixed with a supporting portion of the bracket, and the remaining portion of the bearing is fit into a supporting portion of the bearing cap. The bearing cap is fixed to the bracket by inserting a bolt into a fastening portion at both end portions of the bearing cap, and screwing the bolt into a threaded hole in the bracket. A pin through-hole that extends in the axial direction of the driveshaft from the threaded hole is provided in the bracket, and the pin through-hole is open to the bracket outer surface. A pin is press-fit into this through-hole. When the bolt is screwed into the threaded hole in the bracket, the pin is pushed by the bolt so as to protrude out of the bracket, and presses on a pressed portion of the bearing cap. Consequently, the bearing is slid in the axial direction of the driveshaft together with the bearing cap, and one side of the bearing abuts against a reference surface provided on the supporting portion of the bracket. As a result, the bearing is accurately positioned.

SUMMARY

With the device described above, the entire reference surface and the inner surface of the supporting portion of the bracket that the outer surface of the bearing is fitted to must be machined, and the dimensional accuracy of these must be increased over a wide area, in order to accurately position the bearing. However, such machining becomes increasingly difficult the wider the machining area is, which may lead to an increase in cost, for example.

The disclosure thus provides a support device for a bearing that rotatably supports a shaft (e.g., a driveshaft), which reduces an abutting region involved with positioning the bearing, in a bracket provided on a vehicle side.

An example aspect of the present disclosure provides a support device for a bearing. The bearing is configured to rotatably support a shaft that extends in a first direction. The support device includes a case and a bracket. The case is configured to house the bearing. The case includes a case main body and a case fixing portion. The case fixing portion is provided on an outside of the case main portion. The bracket fixed to a base body. The bracket includes a bracket main body and a bracket fixing portion. The bracket main body is configured to house at least a portion of the case main body. The case fixing portion is fixed to the bracket fixing portion by an engagement member. A first case abutting portion and a second case abutting portion are provided on an outer surface of the case main body. A first bracket abutting portion and a second bracket abutting portion are provided on a surface of the bracket main body. The first case abutting portion abuts against the first bracket abutting portion so as to define a position of the case with respect to the bracket in the first direction. The second case abutting portion abuts against the second bracket abutting portion so as to define a position of the case with respect to the bracket in a second direction. The second direction is a direction is a direction that forms a right angle with the first direction. The case fixing portion abuts against the bracket in a third direction. The third direction is a direction that forms a right angle with both the first direction and the second direction. When the case is fixed to the bracket, the case and the bracket are separated at a region between a first abutting location of the first case abutting portion and the first bracket abutting portion, and a second abutting location of the second case abutting portion and the second bracket abutting portion, in a circumferential direction of the bearing housed in the case.

In the support device, a portion of the surface of the bracket main body that faces the outer surface of the case main body, other than the first bracket abutting portion and the second bracket abutting portion, may be separated from the case main body.

In the support device, abutting surfaces where the first case abutting portion and the first bracket abutting portion abut against each other may be each a flat surface, and the abutting surfaces where the second case abutting portion and the second bracket abutting portion abut against each other may be each a flat surface. Abutting surfaces where the case fixing portion and the bracket fixing portion abut against each other may be each a flat surface.

In the support device, the abutting surface of the bracket fixing portion against which the abutting surface of the case fixing portion may abut extends along a plane defined by the first direction and the second direction. The engaging member may be a threaded member. When the case is fixed to the bracket, the threaded member may extend in the third direction, may be in a state passing through a hole in the case fixing portion, and may be screwed into a threaded hole in the bracket fixing portion.

In the support device, the first case abutting portion may be configured as a protruding portion that protrudes in a radial direction from the outer surface of the case main body. The first bracket abutting portion may be configured as a protruding portion that protrudes from the surface of the bracket main body. The first case abutting portion and the first bracket abutting portion each may have an abutting surface that faces in the first direction and abuts against the other.

In the support device, the second direction may be a vertical direction. The second case abutting portion may be in one of a recessed shape and a protruding shape. The second bracket abutting portion may be in one of a recessed shape and a protruding shape. In the support device, the second case abutting portion may include a third abutting portion positioned on a vertically upper side of the case main body, and a fourth abutting portion positioned on a vertically lower side of the case main body. The second bracket abutting portion may include a fifth abutting portion that abuts against the third abutting portion, and a sixth abutting portion that abuts against the fourth abutting portion.

In the support device, the shaft may be a driveshaft.

According to the structure described above, when fixing the case fixing portion and the bracket fixing portion together by the engaging member (i.e., when fixing the case to the bracket), the case (i.e., the bearing housed in the case) is able to be positioned in the first direction by the abutment of the first case abutting portion and the first bracket abutting portion. Also, the case is able to be positioned in the second direction (that forms a right angle with the first direction) by the abutment of the second case abutting portion and the second bracket abutting portion. Furthermore, the case is able to be positioned in the third direction (that forms a right angle with both the first direction and the second direction) by the abutment of the case fixing portion and the bracket fixing portion. Also, when the case is fixed to the bracket, there is a region where the case and the bracket are separated, between an abutting location of the first case abutting portion and the first bracket abutting portion, and an abutting location of the second case abutting portion and the second bracket abutting portion, in a circumferential direction of the bearing housed in the case. Therefore, according to this aspect, the positioning of the case in the first direction and the positioning of the case in the second direction are separate, so the positioning accuracy of these is able to be easily increased. Also, the abutting region of the bracket main body and the case main body that houses the bearing, for positioning the bearing when fixing the case fixing portion and the bracket fixing portion together by the engaging member, is able to be reduced to the abutting location of the first case abutting portion and the first bracket abutting portion, and the abutting location of the second case abutting portion and the second bracket abutting portion.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, one example embodiment will be described with reference to the accompanying drawings.

Figure 1:
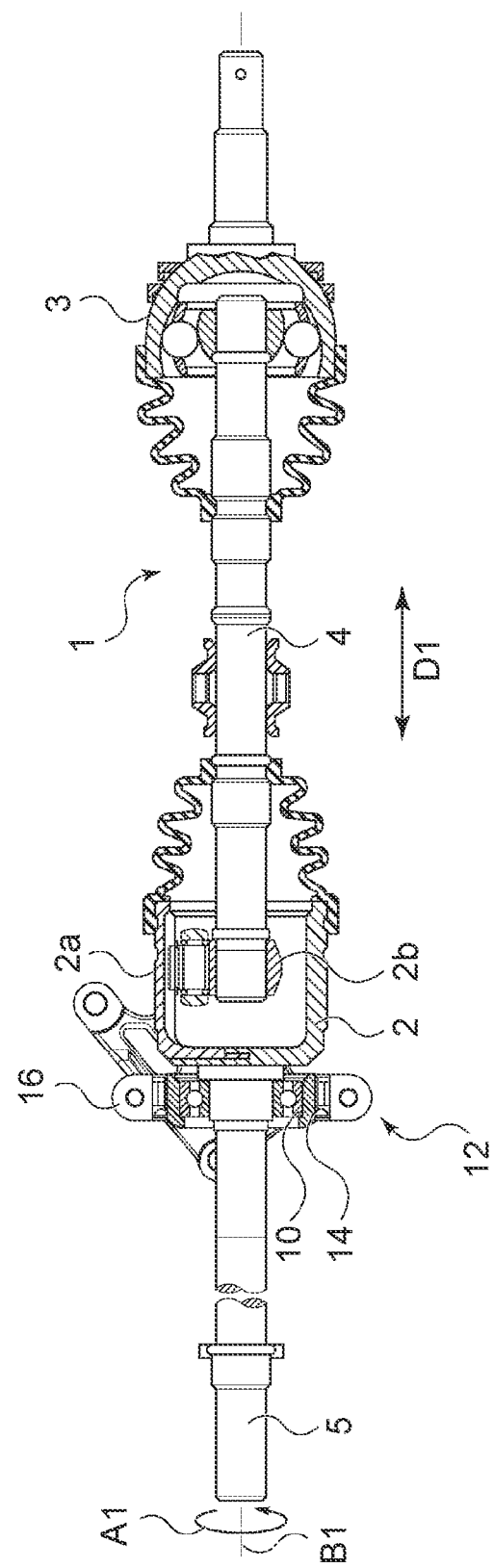
FIG. 1 is a sectional view of the structure of a driveshaft to which a support device according to one example embodiment has been applied.

A driveshaft 1 shown in FIG. 1 includes a constant velocity sliding joint 2, a wheel-side joint 3, and a center shaft 4. The constant velocity sliding joint 2 is a driving-side joint. The wheel-side joint 3 is a driven-side joint. The center shaft 4 connects the constant velocity sliding joint 2 and the wheel-side joint 3 together. A stem shaft 5 is coupled to an outer member (outer race) 2a of the constant velocity sliding joint 2. The stem shaft 5 is connected to an output shaft of a transmission, not shown, and is rotatably driven in the direction indicated by arrow A1. The center shaft 4 is connected to an inner member 2b of the constant velocity sliding joint 2. Therefore, when the stem shaft 5 and the outer member 2a are rotatably driven, the center shaft 4 is rotated via the constant velocity sliding joint 2. The rotating force of the center shaft 4 is transmitted to the wheel-side joint 3 and rotates wheels, not shown.

The driveshaft 1 is rotatably supported by an engine main body, not shown, via a center bearing 10. A support device 12 according to this example embodiment is applied as a support device of the center bearing 10 in a position such as that shown in FIG. 1. Hereinafter, the support device 12 will be described with reference to FIGS. 2 to 14.

Figure 2:
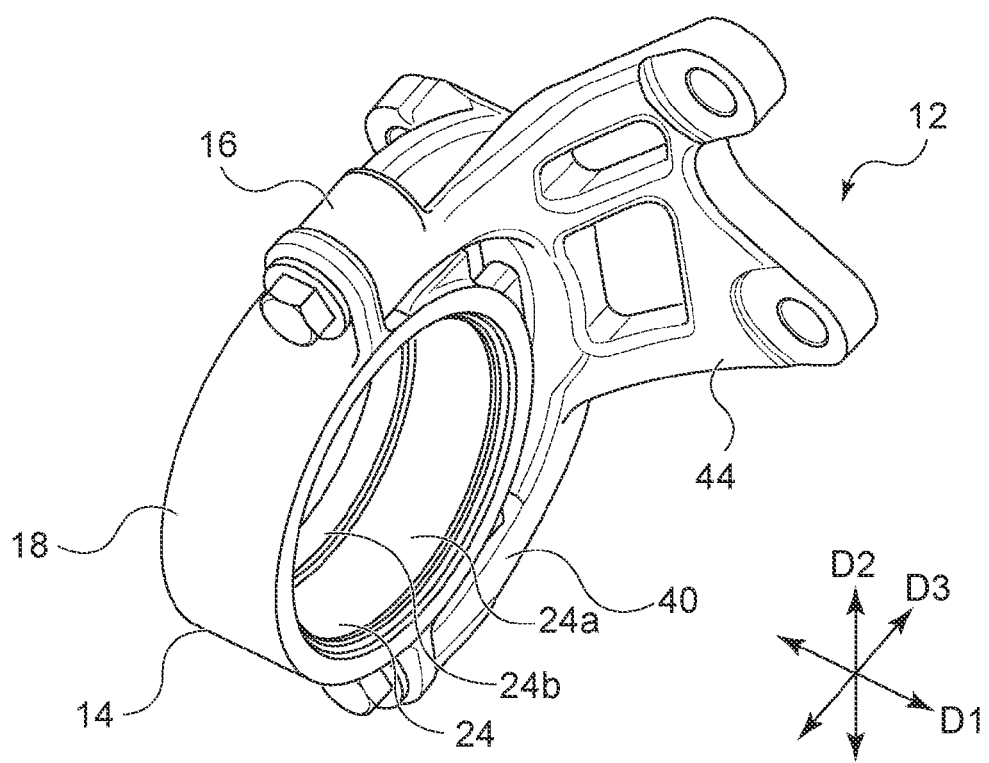
FIG. 2 is a perspective view of the support device in FIG. 1.
Figure 3:
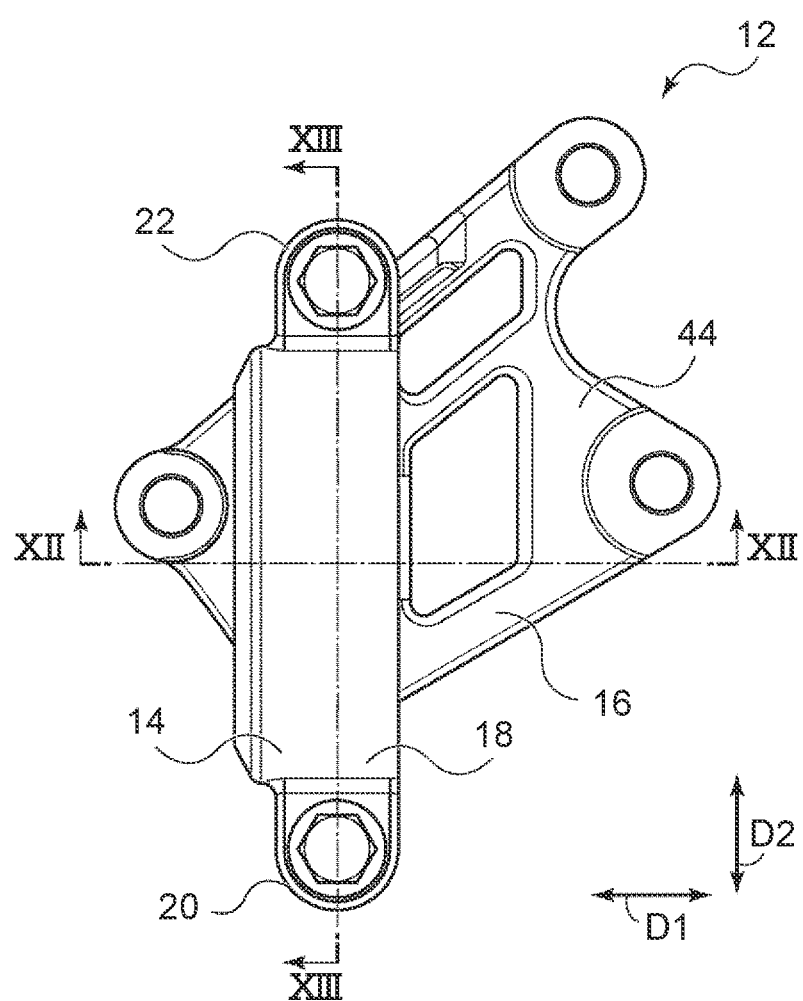
FIG. 3 is a side view of the support device in FIG. 1.
Figure 4:
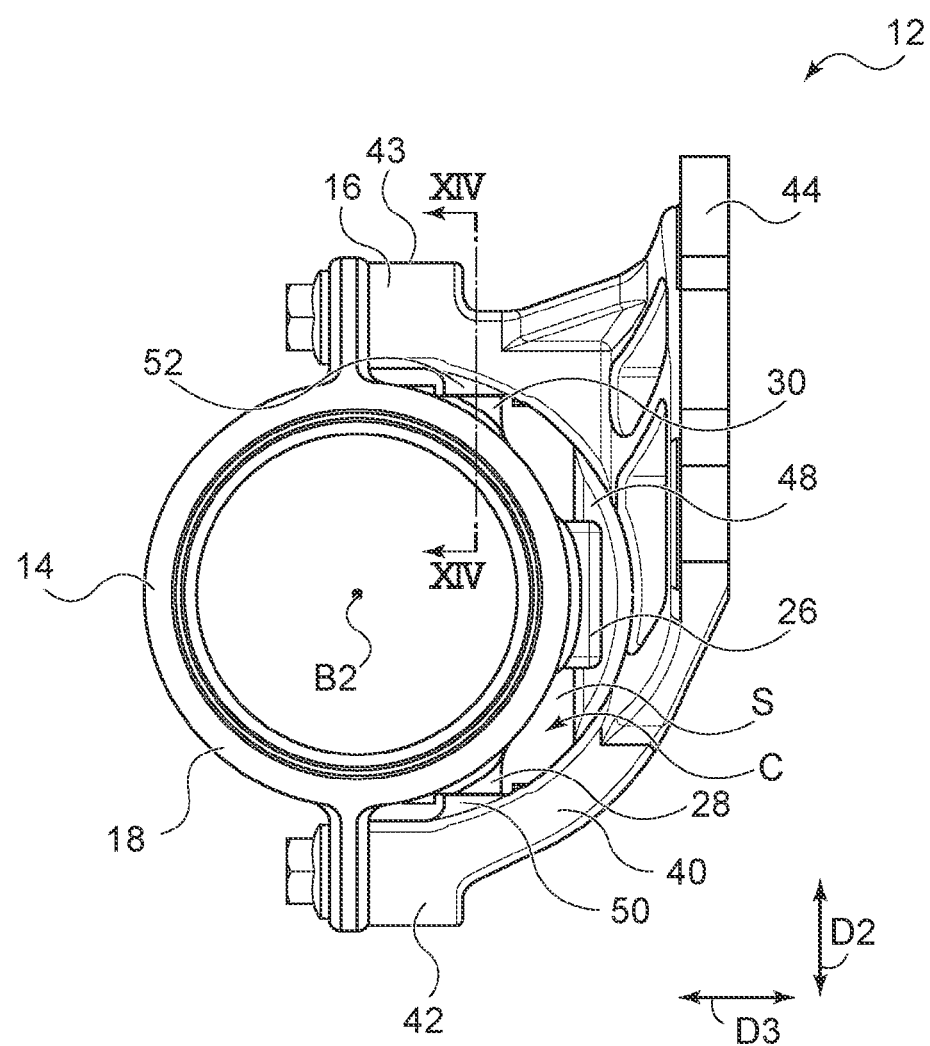
FIG. 4 is a front view of the support device in FIG. 1.

FIGS. 2 to 4 are views of the support device 12. The support device 12 includes a case 14 and a bracket 16. The case 14 is configured to house the center bearing 10 therein. The case 14 is fixed to the bracket 16 using bolts that are threaded members (one example of an engaging member). The bracket 16 is fixed to the engine main body that serves as a base body, or more particularly in this case, to an outer surface of an engine block. In this way, the driveshaft 1 is able to rotate as described above, with the case 14 that houses the center bearing 10 fixed to the bracket 16 (see FIG. 1).

Figure 5:
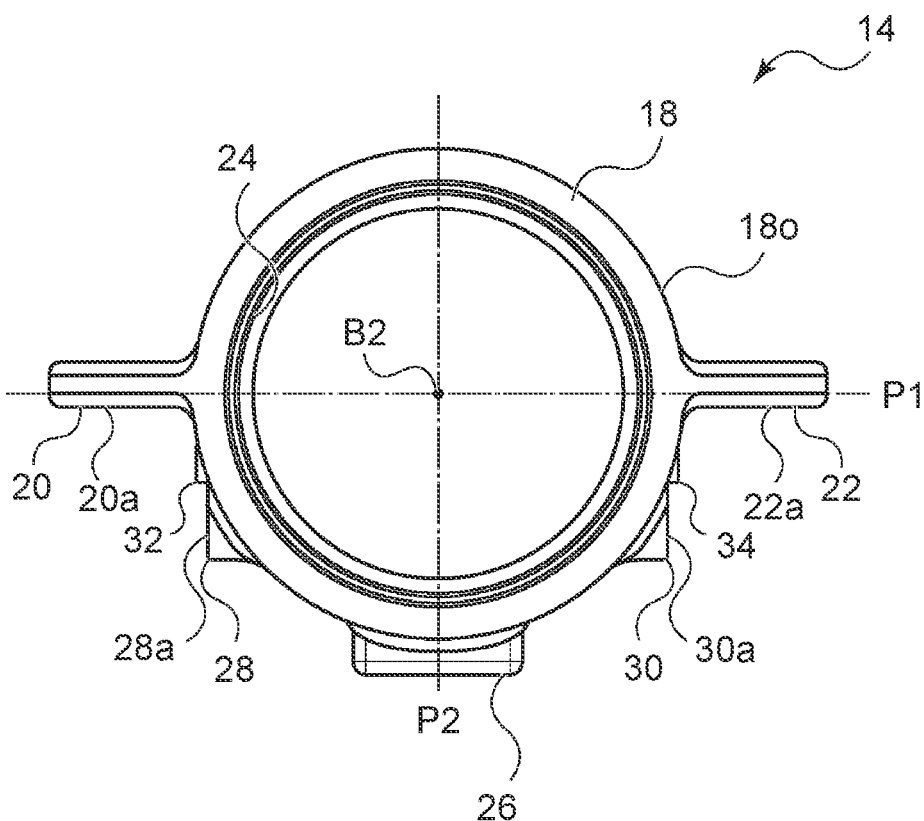
FIG. 5 is a front view of a case of the support device in FIG. 1.
Figure 6:
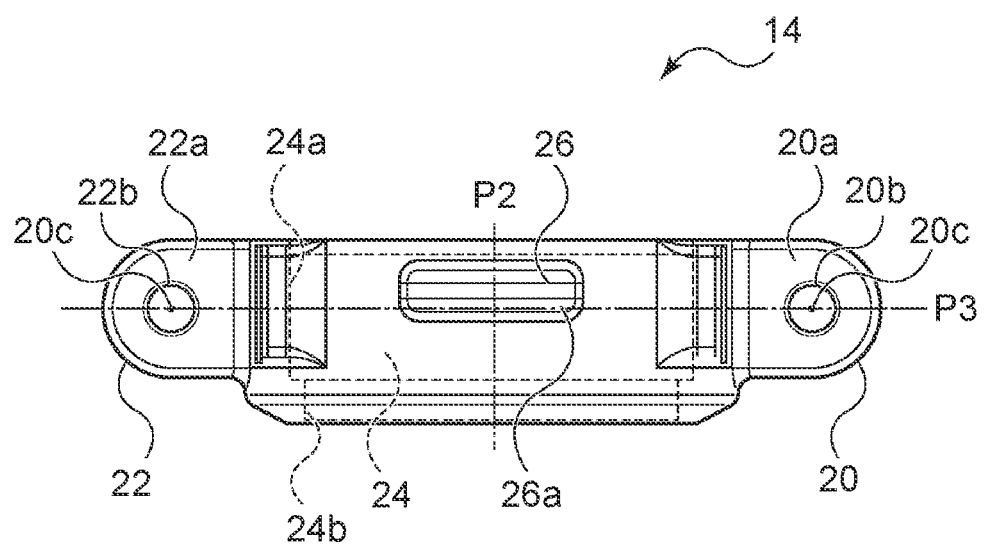
FIG. 6 is a bottom view of the case of the support device in FIG. 1.
Figure 7:
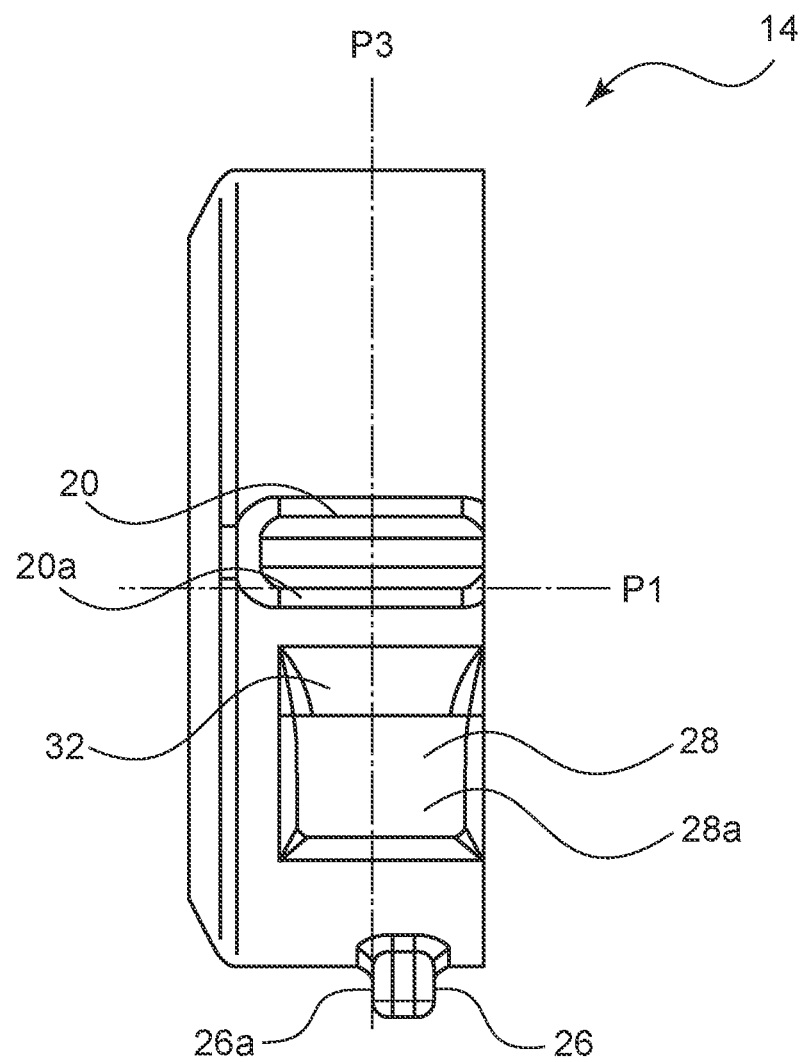
FIG. 7 is a side view of the case of the support device in FIG. 1.

FIGS. 5 to 7 are views of the case 14. The case 14 includes a case main body 18, and case fixing portions (fastening portions) 20, 22. The case 14 is manufactured by casting, and only abutting surfaces 20a, 22a, 26a, 28a, 30a that will be described later, are machined on an outer surface of the case 14.

The case main body 18 has a generally cylindrical shape. The case main body 18 is provided with a receiving hole 24 having a circular cross-section passing through the center portion of the case main body 18. In the state shown in FIG. 1, a center axis B2 of the receiving hole 24 is aligned with an axis B1 of the driveshaft 1. The receiving hole 24 has a receiving portion 24a that has an inner diameter that is the same as an outer diameter of the center bearing 10, and an annular wall portion 24b that has an inner diameter that is smaller than the outer diameter of the center bearing 10. The axis of the receiving portion 24a is aligned with the axis of the annular wall portion 24b. The center bearing 10 is inserted into the receiving portion 24a of the receiving hole 24 along the center axis B2 from a different side than the side where the annular wall portion 24b is provided, and the center bearing 10 is fit in until it abuts against the annular wall portion 24b. The case main body 18 is formed such that the center bearing 10 fits securely in the receiving portion 24a.

The case 14 includes two case fixing portions 20, 22. Each of these two case fixing portions 20, 22 is provided on a radially outer side of the case main body 18, on an outer surface 18o of the case main body 18, so as to extend along a first virtual plane P1 defined so as to include the center axis B2 of the receiving hole 24. Therefore, the two case fixing portions 20, 22 are positioned on opposite sides of the case main body 18 from each other. The case fixing portions 20, 22 each have a flat plate shape. The case fixing portions 20, 22 include abutting surfaces 20a, 22a, respectively. The abutting surfaces 20a, 22a are parallel, in this case parallel, to the first virtual plane P1, in one region (the region on the lower side in FIG. 5) from among two regions that are divided by the first virtual plane P1. The abutting surfaces 20a, 22a are formed as machined flat surfaces. Also, one bolt through-hole 20b, 22b is formed in each of the abutting surfaces 20a, 22a. The bolt through-holes 20b, 22b both have a center axis 20c, 22c that extends in a direction orthogonal to the first virtual plane P1.

Furthermore, a case center protruding portion (one example of a first case abutting portion) 26, and two case-side portion protruding portions (one example of a second case abutting portion) 28, 30, are provided on the outer surface 18o of the case main body 18, in the one region (the region on the lower side in FIG. 5) of the first virtual plane P1. As is evident from FIG. 5, the case center protruding portion 26 and the case-side portion protruding portions 28, 30 are separated from each other in the circumferential direction around the center axis (i.e., the center axis B2) of the center bearing 10 that is housed in the case main body 18, on the outer surface 18o of the case main body 18. This helps to ensure a region where the case 14 and the bracket 16 are separated, in the circumferential direction, between these protruding portions 26, 28, 30, when the case 14 is fixed to the bracket 16, as will be described later.

The case center protruding portion 26 is provided in the center portion of the case main body 18, in one of the two regions that are divided by the first virtual plane P1 in FIG. 5, and is provided extending from the outer surface 18o of the case main body 18 in a direction away from the first virtual plane P1. The case center protruding portion 26 has a generally cuboid shape. Here, a plane that includes the center axis B2 of the receiving hole 24 and is orthogonal to the first virtual plane P1 is defined as a second virtual plane P2. This second virtual plane P2 divides the case center protruding portion 26 essentially in two. That is, the case center protruding portion 26 is formed plane-symmetrical with respect to the second virtual plane P2. Moreover, here, a plane that is orthogonal to both the first virtual plane P1 and the second virtual plane P2, and includes the center axes 20c, 22c of the bolt through-holes 20b, 22b is defined as a third virtual plane P3. As shown in FIG. 6, the majority of the case center protruding portion 26 extends in one of two regions that are divided by the third virtual plane P3. The case center protruding portion 26 includes an abutting surface 26a that forms a right angle with the center axis B2 of the receiving hole 24 (i.e., that faces in the direction of the center axis B2). The abutting surface 26a extends parallel to the third virtual plane P3, and more preferably, is parallel to the third virtual plane P3. The abutting surface 26a abuts against a first bracket abutting portion, described later, and is formed so as to contribute to the positioning of the case 14, i.e., the center bearing 10, in the axial direction (a first direction). Therefore, the abutting surface 26a is made a flat surface by machining, and the accuracy of the surface thereof is increased.

Moreover, the two case-side portion protruding portions 28, 30 are formed plane-symmetrical with respect to the second virtual plane P2. One case-side portion protruding portion 28 is arranged on the left side of the second virtual plane P2 in FIG. 5, and is provided in a position midway between the case fixing portion 20 on the left side of the second virtual plane P2 and the case center protruding portion 26, in the circumferential direction of the outer surface 18o of the case main body 18, on this outer surface 18O. Similarly, the other case-side portion protruding portion 30 is arranged on the right side of the second virtual plane P2 in FIG. 5, and is provided in a position midway between the case fixing portion 22 on the right side of the second virtual plane P2 and the case center protruding portion 26, in the circumferential direction of the outer surface 18o of the case main body 18, on this outer surface 18O. The case-side portion protruding portions 28, 30 have generally triangular shapes in cross-sections parallel to the third virtual plane P3. Each of these case-side portion protruding portions 28, 30 has an abutting surface 28a, 30a that faces in a direction away from the second virtual plane P2, and extends parallel to the second virtual plane P2. The abutting surfaces 28a, 30a of the case-side portion protruding portions 28, 30 may also be parallel to the second virtual plane P2. If the abutting surfaces 28a, 30a are inclined with respect to the second virtual plane P2, extended planes, not shown, of the abutting surfaces may intersect with the second virtual plane P2 in the region where the abutting surfaces are positioned, of the two regions divided by the first virtual plane P1. This is so that the abutting surfaces 28a, 30a abut against a second bracket abutting portion, described later. The abutting surfaces 28a, 30a abut against the second bracket abutting portion, described later, and thus contribute to the positioning of the case, i.e., the center bearing 10, in a vertical direction (a second direction).

Step portions 32, 34 are also provided between the case-side portion protruding portions and the case fixing portions positioned near these case-side portion protruding portions, on the outer surface 18o of the case main body 18. These step portions 32, 34 are created as a result of forming the abutting surfaces 28a, 30a into flat surfaces by machining. That is, the step portions 32, 34 are residual portions of the case-side portion protruding portions 28, 30 (i.e., portions that are left over after machining the case-side portion protruding portions 28, 30). Therefore, the step portions 32, 34 do not have to be formed.

Figure 8:
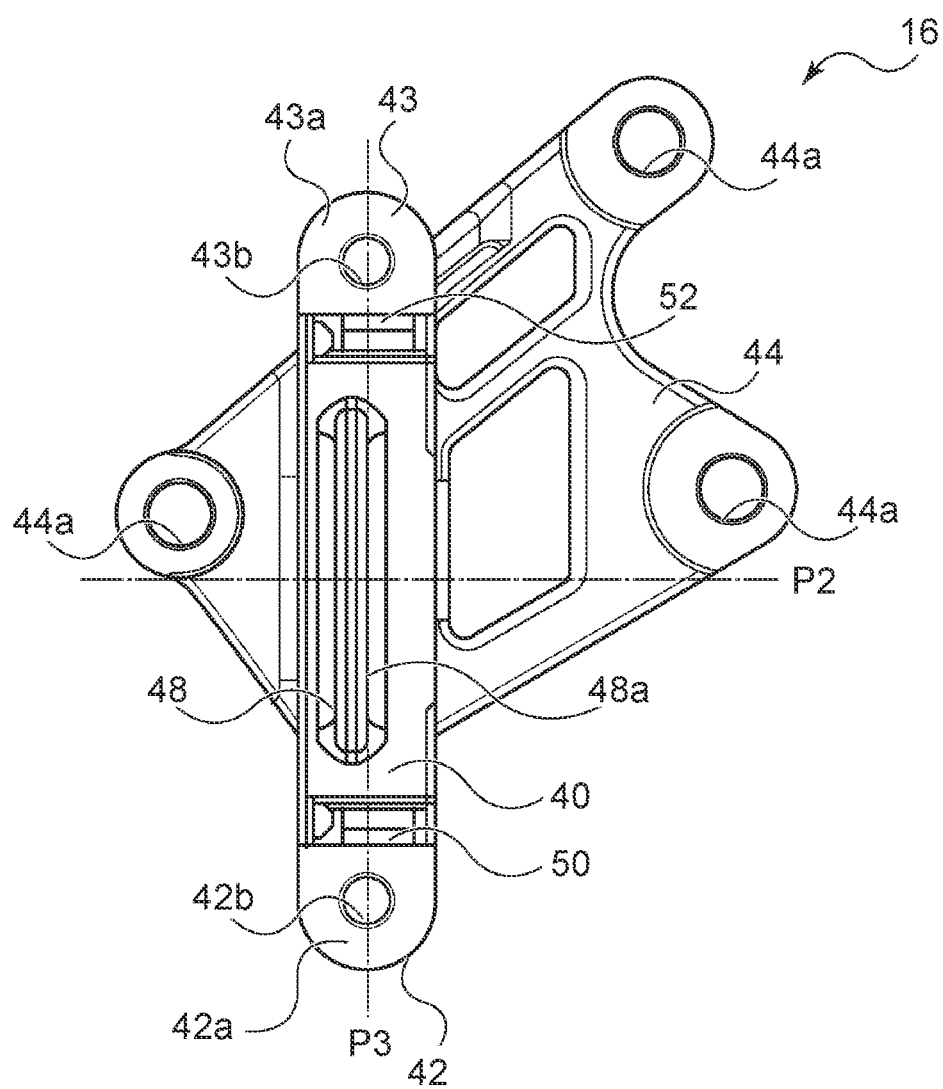
FIG. 8 is a side view of a bracket of the support device in FIG. 1.
Figure 9:
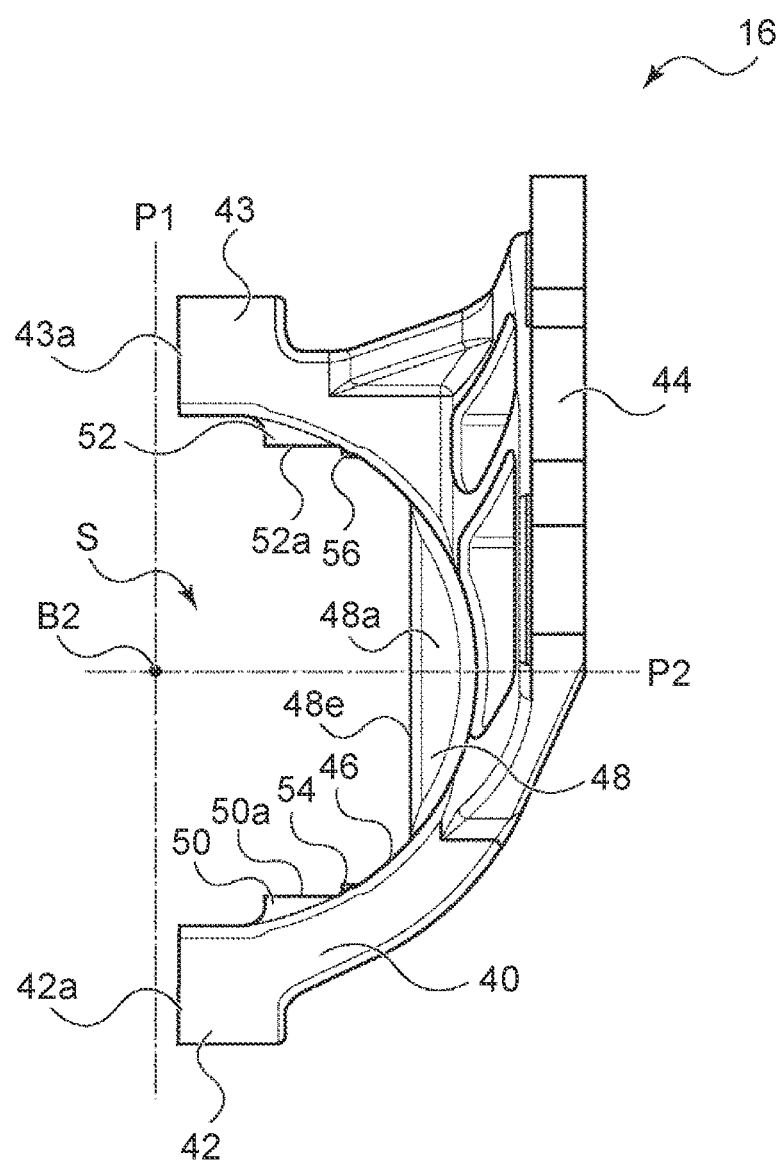
FIG. 9 is a front view of the bracket of the support device in FIG. 1.
Figure 10:
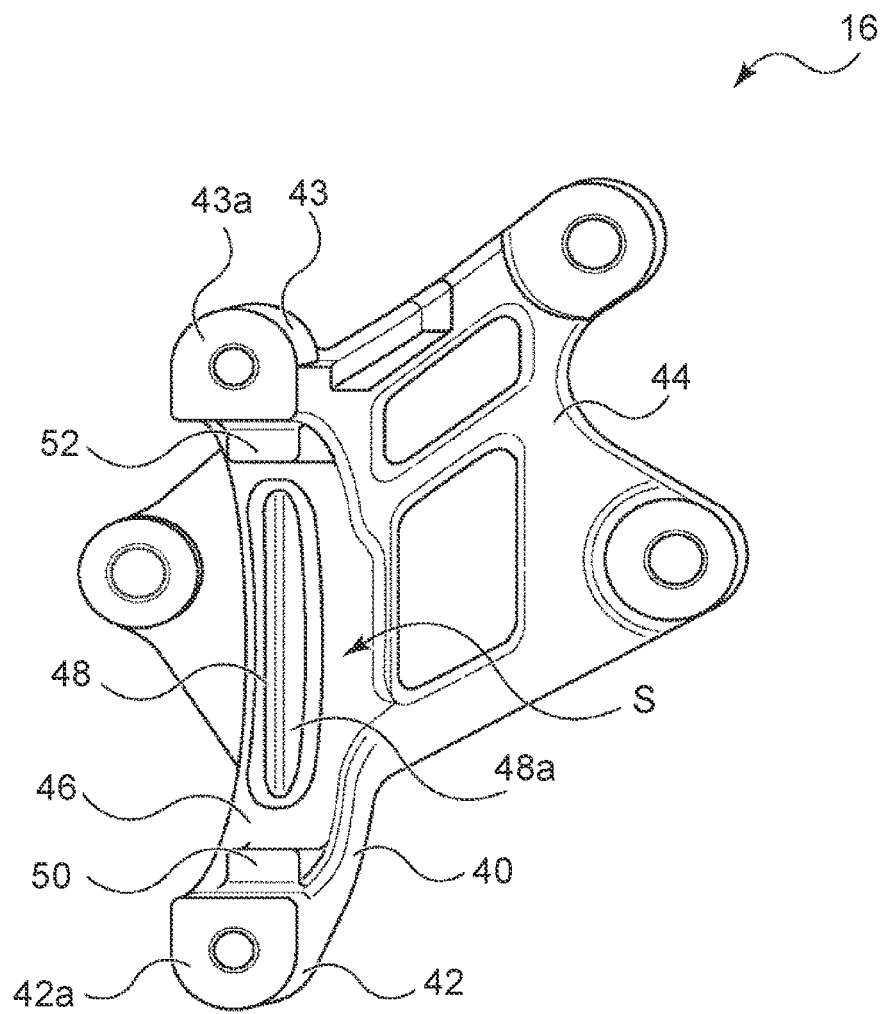
FIG. 10 is a perspective view of the bracket of the support device in FIG. 1.

Next, the bracket 16 will be described. FIGS. 8 to 10 are views of the bracket 16. FIGS. 8 and 9 show the axis B2 and the first to the third virtual planes P1, P2, P3 when it is assumed that the case 14 is fixed to the bracket 16. The orientation of the bracket in FIG. 8 is the same as it is in FIG. 1. The bracket 16 is manufactured by casting, and of a bracket main body that will be described later, only abutting surfaces 48a, 50a, 52a that will be described later are machined. Of a bracket fixing portion, abutting surfaces 42a, 43a and threaded holes 42b, 43b that will be described later are machined.

The bracket 16 includes a bracket main body 40, and bracket fixing portions 42, 43. Furthermore, the bracket 16 includes a base portion 44 for fixing the bracket 16 to an engine main body. Bolt holes for fixing the bracket 16 to the engine main body with bolts (threaded members) are provided in the base portion 44. Here, three bolt holes 44a are provided, as shown in FIGS. 3 and 8 and the like.

The bracket main body 40 is positioned entirely in one of the two regions that are divided by the first virtual plane P1, as shown in FIG. 9. Also, the bracket main body 40 has a recessed surface 46 that has a generally arc-like cross-section to house approximately half of the case main body 18. However, this recessed surface 46 has a shape that follows a virtual ellipse, not shown, that can be set around the axis B1 of the driveshaft 1, and is formed having an inner dimension that is larger than an outer diameter of the outer surface 18o of the case main body 18. Moreover, a bracket inside extending portion (one example of a first bracket abutting portion) 48, and two bracket protruding portions (one example of a second bracket abutting portion) 50, 52 are provided on the recessed surface 46. As is evident from FIG. 9, the bracket inside extending portion 48 and the bracket protruding portions 50, 52 are separated from each other in the circumferential direction around the center axis (i.e., the center axis B2) of the center bearing 10 that is housed in the case main body 18 when the case 14 is fixed to the bracket 16. This helps to ensure a region where the case 14 and the bracket 16 are separated, in the circumferential direction, between these portions 48, 50, 52, when the case 14 is fixed to the bracket 16, as will be described later.

The bracket inside extending portion 48 is provided in the center portion of the recessed surface 46 of the bracket main body, in one of the two regions that are divided by the first virtual plane P1, and is formed extending from the recessed surface 46 toward the first virtual plane P1. The bracket inside extending portion 48 has a generally arc-like cross-section, and has a linear end edge portion 48e that extends parallel to the first virtual plane P1. The bracket inside extending portion 48 is divided into two by the second virtual plane P2, and is plane-symmetrical with respect to the second virtual plane P2. Moreover, the bracket inside extending portion 48 essentially extends in the other of the two regions that are divided by the third virtual plane P3. This other region is a region that is different from the region where the majority of the case center protruding portion 26 is arranged. The bracket inside extending portion 48 includes an abutting surface 48a that extends in a manner facing the region where the majority of the case center protruding portion 26 is arranged, of the two regions that are divided by the third virtual plane P3. The abutting surface 48a extends parallel to the third virtual plane P3, or more preferably, is parallel to the third virtual plane P3. The abutting surface 48a is formed so as to abut against the abutting surface 26a of the case center protruding portion (one example of the first case abutting portion) 26, when the support device 12 is assembled. Therefore, the abutting surface 48a is formed as a flat surface, in which the accuracy of the surface thereof is increased by machining.

Furthermore, the two bracket protruding portions 50, 52 are formed plane-symmetrical with respect to the second virtual plane P2. One bracket protruding portion 50 is arranged on the lower side of the second virtual plane P2 in FIG. 9, and is arranged closer to the first virtual plane P1 than the bracket inside extending portion 48 is, in the circumferential direction of the recessed surface 46 of the bracket main body 40, on this recessed surface 46. Similarly, the other bracket protruding portion 52 is arranged on the upper side of the second virtual plane P2 in FIG. 9, and is arranged closer to the first virtual plane P1 than the bracket inside extending portion 48 is, in the circumferential direction of the recessed surface 46 of the bracket main body 40, on this recessed surface 46. The bracket protruding portions 50, 52 have generally triangular shapes in cross-sections parallel to the third virtual plane P3. Each of these bracket protruding portions 50, 52 has an abutting surface 50a, 52a that faces the second virtual plane P2, and extends parallel to the second virtual plane P2. The abutting surface 50a, 52a of the bracket protruding portions 50, 52 may also be parallel to the second virtual plane P2. When the abutting surfaces 50a, 52a are inclined with respect to the second virtual plane P2, extended planes (not shown) of the abutting surfaces may intersect with the second virtual plane P2 in the region where the abutting surfaces are positioned, of the two regions divided by the first virtual plane P1. This is so that the abutting surfaces 50a, 52a will against the second bracket abutting surfaces 28a, 30a of the second case abutting portion described above. The abutting surface 50a, 52a abut against the abutting surfaces 28a, 30a, respectively, described above, and are formed as flat surfaces by machining so as to contribute to the positioning of the case, i.e., the center bearing 10, in the vertical direction.

Step portions 54, 56 are also provided between the bracket protruding portion and the bracket inside extending portion, on the recessed surface 46 of the bracket main body 40. These step portions 54, 56 are created as a result of forming the abutting surfaces 50a, 52a by machining. That is, the step portions 54, 56 are residual portions of the bracket protruding portions 50, 52 (i.e., portions that are left over after machining the bracket protruding portions 50, 52). Therefore, the step portions 54, 56 do not have to be formed.

Moreover, as described above, the bracket 16 includes the two bracket fixing portions 42, 43. The two bracket fixing portions 42, 43 are also positioned entirely in one region (the region where the bracket main body 40 is positioned), of the two regions divided by the first virtual plane P1, as shown in FIG. 9, similar to the bracket main body 40. The bracket fixing portions 42, 43 are arranged on both sides (i.e., one on each side), on the radially outer side of the bracket main body. Also, the bracket fixing portions 42, 43 are positioned on opposite sides of the bracket main body 40 from each other, with reference to the second virtual plane P2. The bracket fixing portions each have an abutting surface 42a, 43a that is parallel to the first virtual plane P1 on one end portion, and also have a threaded hole 42b, 43b open in this abutting surface 42a, 43a. These abutting surfaces 42a, 43a are flat surfaces formed by machining, that are able to securely abut against the abutting surfaces 20a, 22a of the case main body. Also, when a direction that forms a right angle with a direction (the first direction) D1 of the axis B1 of the drive shaft is set as a second direction D2 on a first virtual plane, the second direction D2 is a direction that connects the bracket protruding portions 50, 52 together, and is a vertical direction when the bracket 16 is fixed to the engine main body as shown in FIG. 1. In this case, the abutting surfaces 42a, 43a extend along a virtual plane (a plane that is parallel to the first virtual plane P1) defined by the first direction and the second direction, respectively. Furthermore, when a direction that forms a right angle with both the first direction and the second direction is defined as a third direction D3, the axes of the threaded holes 42b, 43b extend in (parallel to) this third direction D3. To facilitate understanding, the first direction D1, the second direction D2, and the third direction D3, when the support device 12 is applied to support the driveshaft 1 as shown in FIG. 1, are shown in FIGS. 1 to 4 and FIG. 11 for reference.

Figure 11:
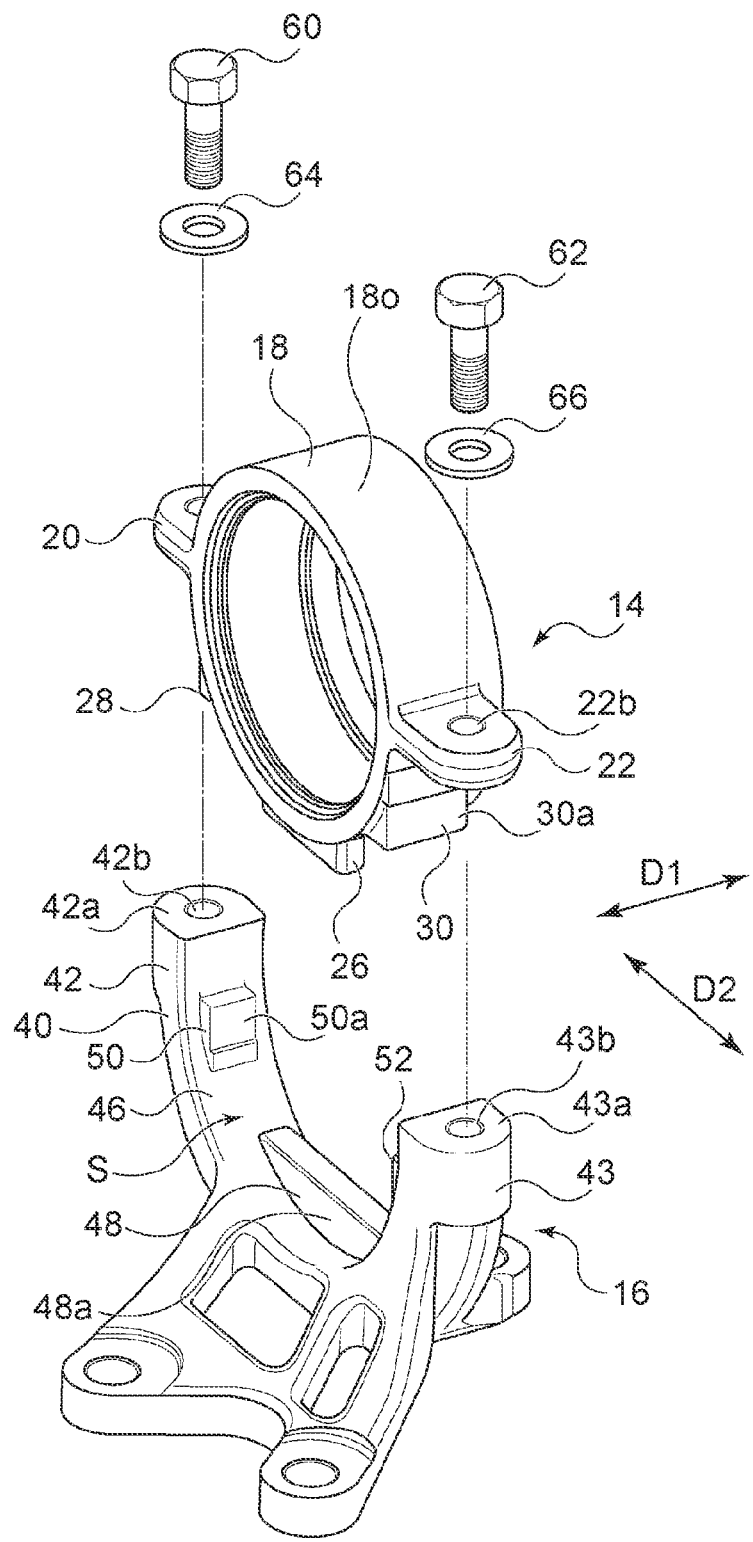
FIG. 11 is an exploded perspective view of the support device in FIG. 1.

As described above, the case 14 and the bracket 16 of the support device 12 each have the structures described above. Now the assembly of the case 14 and the bracket 16 will be further described. The bracket 16 will be described below with the bracket protruding portion 52 fixed to the engine main body in a position on the vertically upper side with respect to the bracket protruding portion 50, the first direction being a horizontal direction, and the second direction being a vertical direction, as shown in FIG. 1. FIG. 11 is an exploded perspective view of the support device 12.

First, the case main body 18 is inserted into a housing space S defined by the recessed surface 46 of the bracket main body 40. The case 14 is moved with respect to the bracket 16 such that the abutting surface 26a of the case center protruding portion 26 on the outer surface 18o of the case main body 18 firmly abuts against the abutting surface 48a of the bracket inside extending portion 48 of the recessed surface 46 of the bracket main body 40 in the first direction, i.e., the axial direction, and the two engage together. Furthermore, the case 14 is moved with respect to the bracket 16 such that the abutting surfaces 28a, 30a of the two case-side portion protruding portions 28, 30 on the outer surface 18o of the case main body 18 firmly abut against the abutting surfaces 50a, 52a of the bracket protruding portions 50, 52 of the recessed surface 46 of the bracket main body 40 in the second direction, i.e., the vertical direction, and the two engage together. In this state, the abutting surfaces 42a, 43a of the two bracket fixing portions 42, 43 face the abutting surfaces 20a, 22a of the case fixing portions 20, 22, respectively, and abut so as to engage together in the third direction that forms a right angle with both the first direction and the second direction. Moreover, while maintaining the abutted and engaged state of the abutting surface 26a of the case center protruding portion 26 and the abutting surface 48a of the bracket inside extending portion 48, and the abutted and engaged state of the abutting surfaces 28a, 30a of the two case-side portion protruding portions 28, 30 and the abutting surfaces 50a, 52a of the two bracket protruding portions 50, 52, the bolts 60, 62 are inserted into the bolt through-holes 20b, 22b in the case 14 via washers 64 and 66. And then, the bolts 60, 62 are screwed into the threaded holes 42b, 43b in the bracket 16, respectively. As a result, the case 14 is fixed to the bracket 16 such that the abutting surfaces 20a, 22a of the case 14 are firmly abutted against the abutting surfaces 42a, 43a of the bracket 16, respectively. The bolt through-holes 20b, 22b in the case 14 may also be slightly offset with respect to the threaded holes 42b, 43b in the bracket 16 such that the abutting surfaces abut against each other more firmly and the case is positioned more firmly with respect to the bracket in this way.

Figure 12:
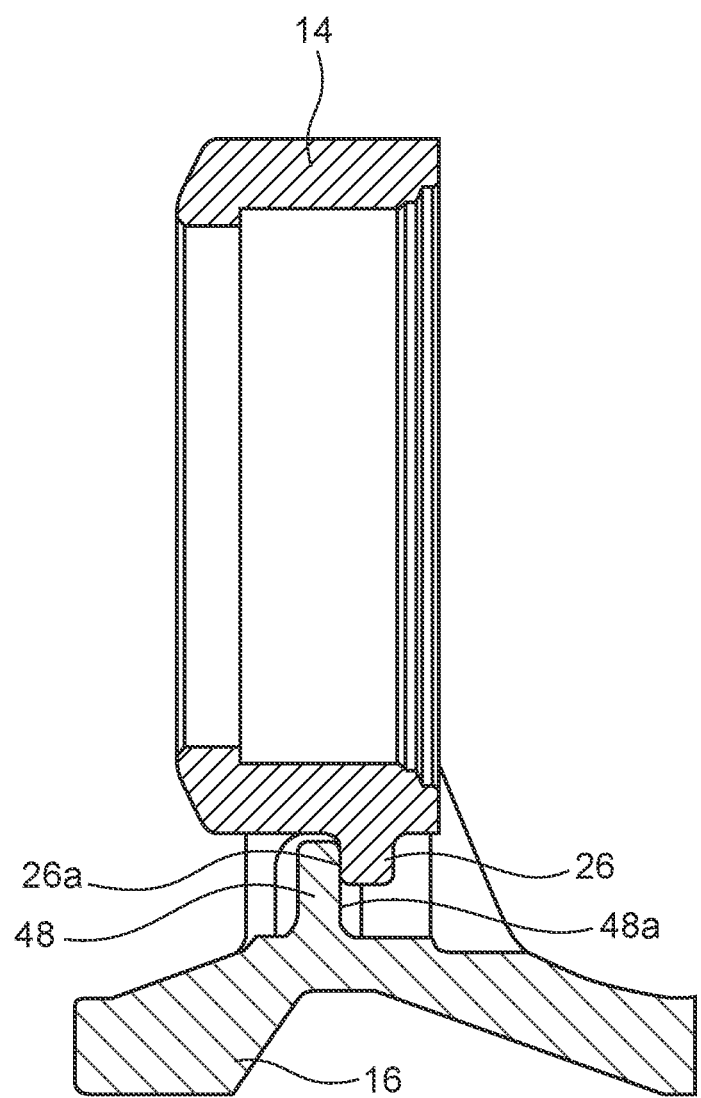
FIG. 12 is a sectional view taken along line XII-XII in FIG. 3, of the support device in FIG. 1.
Figure 13:
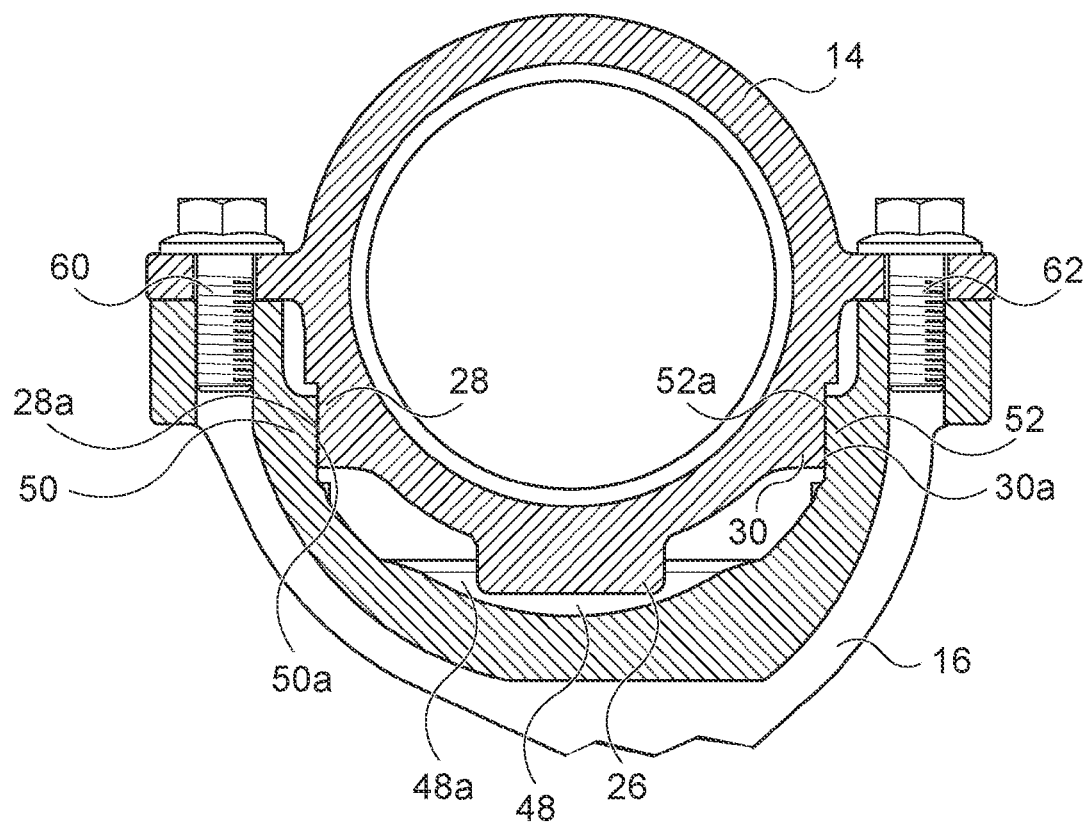
FIG. 13 is a sectional view taken along line XIII-XIII in FIG. 3, of the support device in FIG. 1.
Figure 14:
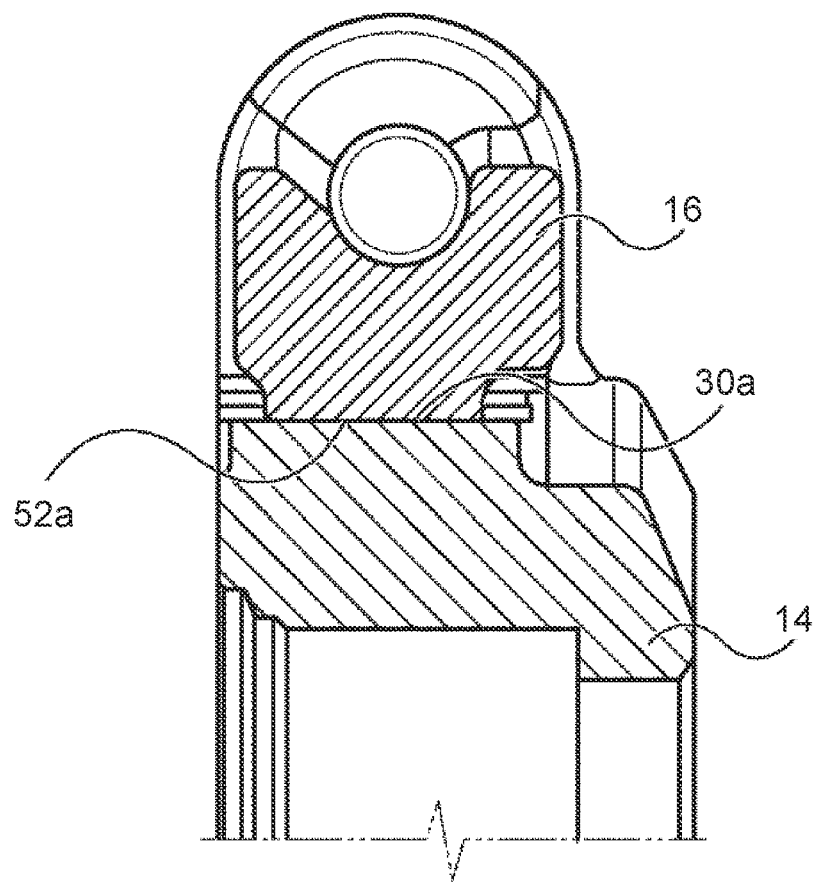
FIG. 14 is a sectional view taken along line XIV-XIV in FIG. 4, of the support device in FIG. 1.

As described above, with the support device 12 of this example embodiment, when fastening and connecting with the bolts 60, 62 that are threaded members (engaging members), the abutting surface 26a of the case center protruding portion 26 as a first case abutting portion of the case 14 firmly abuts against the abutting surface 48a of the bracket inside extending portion 48 as a first bracket abutting portion of the bracket 16 (see FIGS. 12 and 13). As a result, positioning of the case 14, i.e., the center bearing 10 that is housed in the case 14, with respect to the bracket 16 in the first direction D1, i.e., the direction of the axis B1 of the driveshaft 1, is able to be achieved. Moreover, when fastening and connecting with the bolts 60, 62, movement of the case 14 with respect to the bracket 16 in the second direction D2 is restricted by the abutting surfaces 28a, 30a of the two case-side portion protruding portions 28, 30 that serve as the second case abutting portion of the case 14 firmly abutting against the abutting surfaces 50a, 52a of the two bracket protruding portions 50, 52 that serve as the second bracket abutting portion of the bracket 16 (see FIGS. 13 and 14). As a result, the case 14, i.e., the center bearing 10 that is housed in the case 14, is able to be firmly positioned with respect to the bracket 16 in the second direction, i.e., the vertical direction. In particular, here, the direction of the axis of the threaded holes 42b, 43b of the bracket 16 is the third direction D3 (i.e., the fastening direction by the screwed-in bolts is a different direction than the positioning direction thereof), and the abutting surfaces 42a, 43a of the two bracket fixing portions 42, 43 firmly abut against the abutting surfaces 20a, 22a of the two case fixing portions 20, 22. Thus, the case 14, i.e., the center bearing 10 that is housed inside the case 14, is firmly positioned with respect to the bracket 16 in the third direction D3. Therefore, the case 14, i.e., the center bearing 10, is able to be more accurately positioned by fixing the case 14 to the bracket 16 in this way. In this way, the abutting surfaces are each able to display excellent functionality as a positioning surface (or reference surface).

Also, in this way, when fastening the bolts, the case is firmly positioned by the abutment of first abutting portion (the first case abutting portion and the first bracket abutting portion) and the abutment of second abutting portion (the second case abutting portion and the second bracket abutting portion) that are in positions away from each other in the circumferential direction of the center bearing 10, so the portion of the recessed surface 46 of the bracket 16 other than the abutting surface of the bracket inside extending portion 48 and the abutting surfaces 50a, 52a of the two bracket protruding portions 50, 52 is able to be separated from the case main body 18 (see FIGS. 12 and 13). That is, the portion of the recessed surface 46 of the bracket 16, other than these abutting surfaces, that faces the outer surface 18o of the case main body is able to be formed having a clearance C between it and the case main body. Therefore, the portion of the recessed surface 46 of the bracket 16 that is separated from the case main body 18 does not need to be machined. More specifically, with the support device described above, the overall precision machining is able to be reduced to a very small part compared to when the entire recessed surface (cylindrical surface) of the bracket main body needs to be precision machined. As a result, the amount of machining required for positioning is able to be reduced by a corresponding amount, so cost is also able to be reduced.

Also, as described above, and as is evident from FIG. 4 and FIGS. 12 to 14 in particular, the abutting location of the first abutting portion (the first case abutting portion and the first bracket abutting portion) is separated in the circumferential direction of the bearing housed in the case 14, from the abutting location of the second abutting portion (the second case abutting portion and the second bracket abutting portion). In particular, here, as shown in FIG. 4, when the case 14 is fixed to the bracket 16, there is a region (see the clearance C) where the case 14 and the bracket 16 are separated, between the abutting location of the first abutting portion and the abutting location of the second abutting portion. Therefore, machining or forming of the abutting surfaces of these abutting portions is easier, so the accuracy of these abutting surfaces is able to be easily increased. As a result, the positioning of the case 14 with respect to the bracket 16 in the first direction D1 is able to be easily performed separate from the positioning of the case 14 with respect to the bracket 16 in the second direction D2. The reverse is also true.

Figure 15:
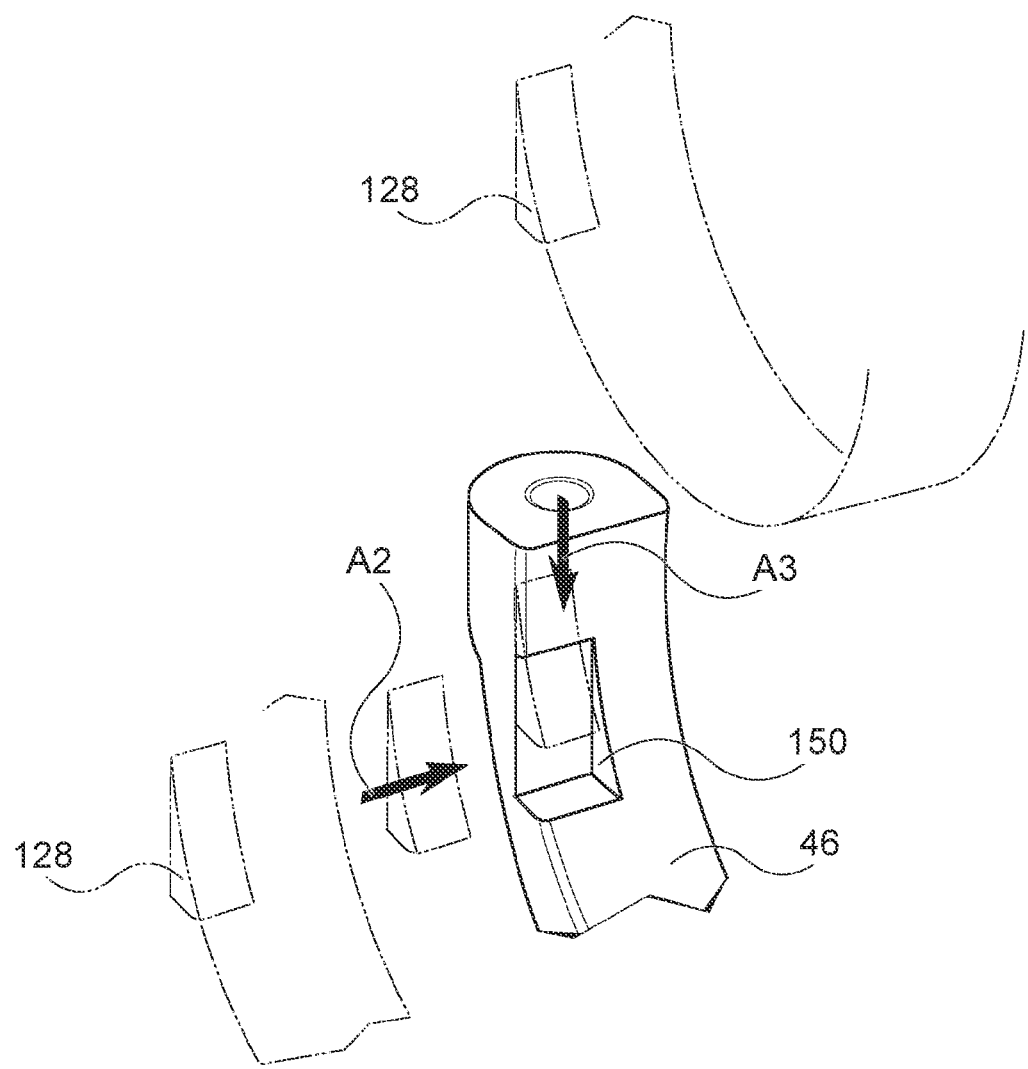
FIG. 15 is an explanatory view of a support device according to another example embodiment.

Heretofore, one example embodiment of the support device is described, but various modifications are also possible. For example, with the support device 12 described above, the case-side portion protruding portions 28, 30 of the case main body and the bracket protruding portions 50, 52 of the bracket main body are each formed in a protruding shape, but at least one may be formed in a recessed shape. For example, as shown in FIG. 15, a recessed abutting portion 150 that is complementary to a side-portion protruding portion 128 of the case main body may be formed on the recessed surface 46 of the bracket main body. In this case, the recessed abutting portion 150 may not only open toward the radially inner side, but also open in the axial direction (the first direction). As a result, the side-portion protruding portion 128 of the case main body can be inserted into the abutting portion 150 from the directions indicated by arrows A2 and A3 in FIG. 15, and moreover, it is possible to prevent this insertion from affecting the positioning by the mutual abutment of the first abutting portion. As shown in FIG. 15, the recessed abutting portion 150 has a width that is greater than the axial width of the side-portion protruding portion 128 in the axial direction, which makes it possible to more reliably prevent the insertion of the side-portion protruding portion 128 of the case main body into the abutting portion 150 from affecting the positioning by the first abutting portion.

Also, in the example embodiment described above, the various abutting surfaces are flat surfaces formed by machining. However, the abutting surfaces are not limited to being flat surfaces. At least one abutting surface or at least a portion of one of the abutting surfaces may be a curved surface. Also, the abutting surfaces are not limited to being machined, and may also be hand formed. Furthermore, abrasive finishing may also be performed on the abutting surfaces to increase the accuracy of the surfaces thereof. Also, one or both of the case 14 and the bracket 16 may be made of an iron alloy or an aluminum alloy or the like by casting, but one or both may also be made of aluminum alloy, for example, by die-casting. In this case, post-processing (e.g., machining) to form the abutting surfaces may be omitted. Furthermore, such post-processing may also be omitted when one or both of the case 14 and the bracket 16 is/are made of resin. When one or both is/are made with resin material, an injection molding method may be used. In this way, a portion (one or some) of the manufacturing processes (in particular, the machining process) may also be omitted depending on the material and manufacturing process.

In the example embodiment described above, the support device 12 is used with a driveshaft. However, this support device may also be applied to a support for a bearing for a variety of other types of shafts. For example, the support device may also support a bearing of a propeller shaft, in particular, a bearing other than a center bearing of a propeller shaft. More particularly, the disclosure may be applied to a drive shaft of a vehicle, and more particularly, to a driveshaft of a so-called FF vehicle or a 4 WD vehicle. Also, the base body to which the bracket is attached is not limited to an engine main body, and may be any of various locations or members depending on the shaft to which the support device is applied. For example, the base body may be a vehicle body when the shaft is a propeller shaft or a rear driveshaft.

The invention is not limited to the example embodiments described above, and includes all modifications, applications, and equivalents included in the concept of the disclosure as determined by the scope of the claims. Therefore, the invention shall not be construed as being limited, and may also be applied to other suitable technologies that fall within the scope of the concept of the invention.

What is claimed is:

1. A support device for a bearing, the bearing being configured to rotatably support a shaft that extends in a first direction, the support device comprising:
   a case configured to house the bearing, the case including a case main body and a case fixing portion, the case fixing portion being provided on an outside of the case main body; and
   a bracket fixed to a base body, the bracket including a bracket main body and a bracket fixing portion, the bracket main body being configured to house at least a portion of the case main body, the case fixing portion being fixed to the bracket fixing portion by an engaging member, wherein
   a first case abutting portion and a second case abutting portion are provided on an outer surface of the case main body,
   a first bracket abutting portion and a second bracket abutting portion are provided on a surface of the bracket main body,
   the first case abutting portion abuts against the first bracket abutting portion so as to define a position of the case with respect to the bracket in the first direction;
   the second case abutting portion abuts against the second bracket abutting portion so as to define a position of the case with respect to the bracket in a second direction,
   the second direction is a direction that forms a right angle with the first direction,
   the case fixing portion abuts against the bracket fixing portion so as to define a position of the case with respect to the bracket in a third direction,
   the third direction is a direction that forms a right angle with both the first direction and the second direction, and
   the case and the bracket are separated at a region between a first abutting location of the first case abutting portion and the first bracket abutting portion, and a second abutting location of the second case abutting portion and the second bracket abutting portion, in a circumferential direction of the bearing housed in the case.

2. The support device according to claim 1, wherein a portion of the surface of the bracket main body that faces the outer surface of the case main body, other than the first bracket abutting portion and the second bracket abutting portion, is separated from the case main body.

3. The support device according to claim 1, wherein abutting surfaces where the first case abutting portion and the first bracket abutting portion abut against each other are each a flat surface,
   abutting surfaces where the second case abutting portion and the second bracket abutting portion abut against each other are each a flat surface, and
   abutting surfaces where the case fixing portion and the bracket fixing portion abut against each other are each a flat surface.

4. The support device according to claim 1, wherein the abutting surface of the bracket fixing portion against which the abutting surface of the case fixing portion abuts extends along a plane defined by the first direction and the second direction,
   the engaging member is a threaded member, and
   the threaded member extends in the third direction, is in a state passing through a hole in the case fixing portion, and is screwed into a threaded hole in the bracket fixing portion.

5. The support device according to claim 1, wherein the first case abutting portion is configured as a protruding portion that protrudes in a radial direction from the outer surface of the case main body,
   the first bracket abutting portion is configured as a protruding portion that protrudes from the surface of the bracket main body, and
   the first case abutting portion and the first bracket abutting portion each have an abutting surface that faces in the first direction, and the abutting surface of the case abutting portion and the abutting surface of the first bracket abutting portion abut against each other.

6. The support device according to claim 1, wherein the second direction is a vertical direction,
   the second case abutting portion is in one of a recessed shape and a protruding shape, and the second bracket abutting portion is in one of a recessed shape and a protruding shape.

7. The support device according to claim 6, wherein
the second case abutting portion includes a third abutting portion positioned on a vertically upper side of the case main body, and a fourth abutting portion positioned on a vertically lower side of the case main body, and
the second bracket abutting portion includes a fifth abutting portion that abuts against the third abutting portion, and a sixth abutting portion that abuts against the fourth abutting portion.

8. The support device according to claim 1, wherein
the shaft is a driveshaft.

\* \* \* \* \*